(12) United States Patent
Kumar et al.

(10) Patent No.: US 12,255,936 B2
(45) Date of Patent: Mar. 18, 2025

(54) AUGMENTING IDENTIFYING METADATA RELATED TO GROUP COMMUNICATION SESSION PARTICIPANTS USING ARTIFICIAL INTELLIGENCE TECHNIQUES

(71) Applicant: Dell Products L.P., Round Rock, TX (US)

(72) Inventors: Dhilip S. Kumar, Bangalore (IN); Hung T. Dinh, Austin, TX (US); Bijan Kumar Mohanty, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/107,288

(22) Filed: Feb. 8, 2023

(65) Prior Publication Data
US 2024/0267419 A1   Aug. 8, 2024

(51) Int. Cl.
*H04L 65/403* (2022.01)
*G06T 7/11* (2017.01)

(52) U.S. Cl.
CPC .............. *H04L 65/403* (2013.01); *G06T 7/11* (2017.01)

(58) Field of Classification Search
CPC ........ G06N 3/08; G06N 20/00; G06N 3/0464; G06V 10/82; G06V 10/22; G06V 10/44; G06V 10/70; G06V 10/764; G06V 2201/09; G06V 30/10; G06V 40/171; G06V 40/174; G06V 40/70; G06F 16/58; G06F 16/783; G06F 16/7837; G06F 16/784; H04M 2201/41; H04M 2203/5081; H04L 65/403; G06T 7/11; G10L 17/00; G10L 2015/227
See application file for complete search history.

(56) References Cited

U.S. PATENT DOCUMENTS

| | | | |
|---|---|---|---|
| 6,304,648 B1 | 10/2001 | Chang | |
| 10,418,030 B2 * | 9/2019 | Hanazawa | G10L 15/22 |
| 10,586,541 B2 * | 3/2020 | Kashtan | G10L 19/018 |
| 11,165,597 B1 * | 11/2021 | Matsuguma | H04L 12/1822 |
| 11,417,343 B2 * | 8/2022 | Cohen | G10L 17/20 |
| 11,587,579 B2 * | 2/2023 | Schiro | G10L 25/78 |

(Continued)

*Primary Examiner* — Alex H. Tran
(74) *Attorney, Agent, or Firm* — Ryan, Mason & Lewis, LLP

(57) ABSTRACT

Methods, apparatus, and processor-readable storage media for augmenting identifying metadata related to group communication session participants using artificial intelligence techniques are provided herein. An example computer-implemented method includes processing, using a first set of artificial intelligence techniques, image data associated with participants of a group communication session and/or video data associated with participants of the group communication session; processing, using a second set of artificial intelligence techniques, audio data associated with participants of the group communication session; identifying at least one of the participants of the group communication session based on the processing of the image data, the processing of the video data, and/or the processing of the audio data; augmenting, in connection with at least one interface associated with the group communication session, identifying metadata attributed to the at least one identified participant; and performing one or more automated actions based on the augmenting of the identifying metadata.

20 Claims, 8 Drawing Sheets

(56) References Cited

U.S. PATENT DOCUMENTS

| | | | |
|---|---|---|---|
| 11,688,399 B2* | 6/2023 | Diamant | H04N 7/15 |
| | | | 704/200 |
| 11,763,823 B2* | 9/2023 | Nareddy | G06F 16/3344 |
| | | | 704/235 |
| 11,854,527 B2* | 12/2023 | Marcinkiewicz | G06F 40/40 |
| 11,893,997 B2* | 2/2024 | Bhowmik | H04R 1/1041 |
| 11,967,314 B2* | 4/2024 | Eden | G10L 17/06 |
| 2008/0147439 A1* | 6/2008 | Maliszewski | G10L 17/00 |
| | | | 705/2 |
| 2016/0255126 A1 | 9/2016 | Sarris | |
| 2017/0270930 A1* | 9/2017 | Ozmeral | H04M 3/56 |
| 2020/0403816 A1* | 12/2020 | Daredia | G06V 40/164 |
| 2022/0358308 A1* | 11/2022 | Hernandez Rivera | |
| | | | G06V 40/174 |
| 2022/0405630 A1* | 12/2022 | Harrison | G06Q 10/0639 |
| 2023/0172563 A1* | 6/2023 | Griffin | A61B 5/7267 |
| | | | 600/301 |

* cited by examiner

AUGMENTING IDENTIFYING METADATA RELATED TO GROUP COMMUNICATION SESSION PARTICIPANTS USING ARTIFICIAL INTELLIGENCE TECHNIQUES

FIELD

The field relates generally to information processing systems, and more particularly to techniques for processing data in such systems.

BACKGROUND

In hybrid work environments, wherein individuals are working partly in an office setting and partly in one or more remote settings, individuals who work in an office often use a common room (e.g., a conference room) to participate in a group audio/video call or meeting, while remote individuals participate using at least one communication application. Using conventional group communication techniques, individuals who participate in such calls from a common office room typically do not need to join individually because they use shared common office room equipment. However, this makes it difficult for individuals who are participating remotely to identify the individuals participating in the common office room, resulting in inefficient and/or time-intensive group communications.

SUMMARY

Illustrative embodiments of the disclosure provide techniques for augmenting identifying metadata related to group communication session participants using artificial intelligence techniques.

An exemplary computer-implemented method includes processing, using a first set of one or more artificial intelligence techniques, one or more of image data associated with one or more participants of a group communication session of two or more participants and video data associated with one or more of the participants of the group communication session. The method also includes processing, using a second set of one or more artificial intelligence techniques, audio data associated with one or more of the participants of the group communication session. Additionally, the method includes identifying at least one of the participants of the group communication session based at least in part on one or more of the processing of the image data, the processing of the video data, and the processing of the audio data, and augmenting, in connection with at least one interface associated with the group communication session, identifying metadata attributed to the at least one identified participant. Further, the method includes performing one or more automated actions based at least in part on the augmenting of the identifying metadata.

Illustrative embodiments can provide significant advantages relative to conventional group communication techniques. For example, problems associated with inefficient and/or time-intensive group communications are overcome in one or more embodiments through automatically augmenting identifying metadata for participants in group communication sessions using artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
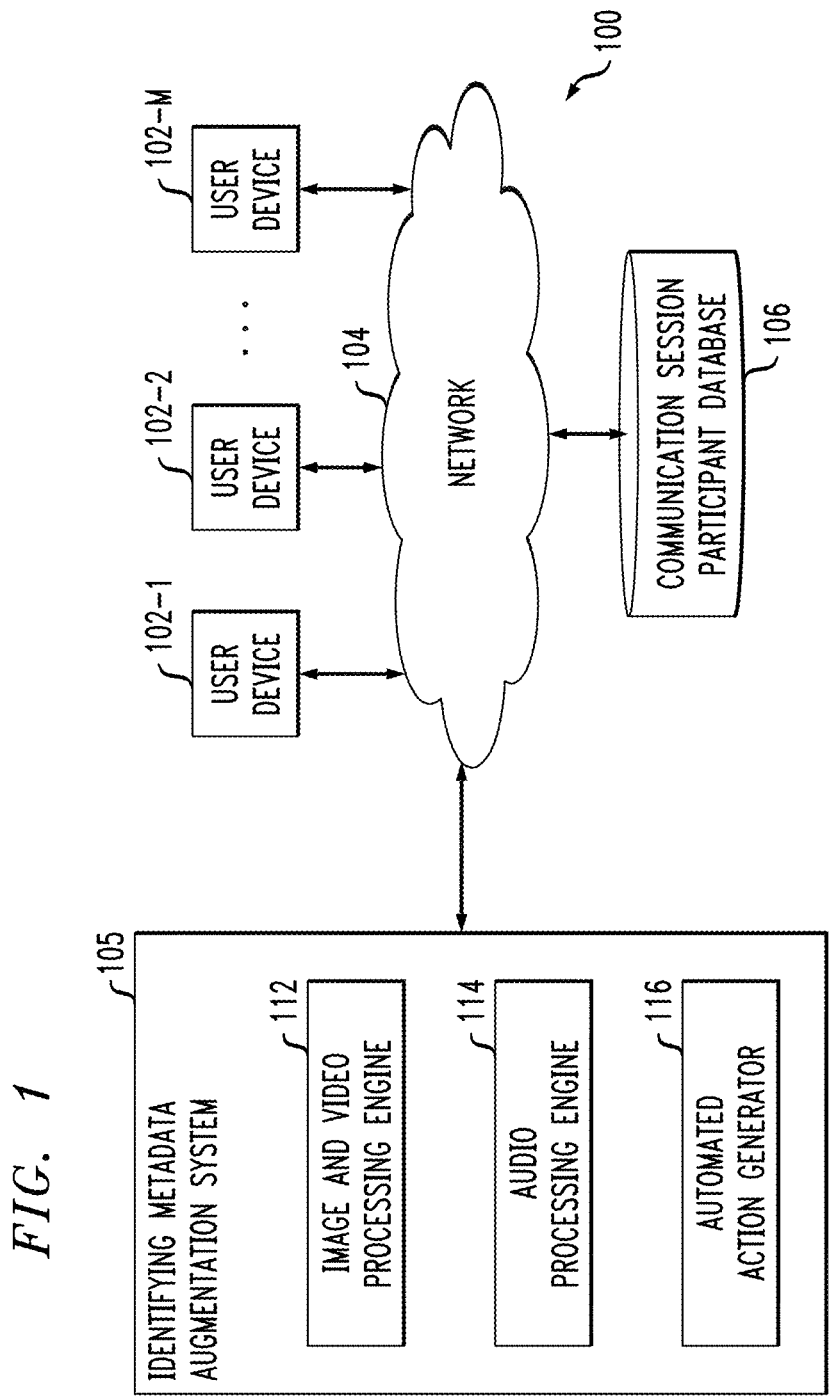
FIG. 1 shows an information processing system configured for augmenting identifying metadata related to group communication session participants using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is identifying metadata augmentation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, identifying metadata augmentation system 105 can have an associated communication session participant database 106 configured to store data pertaining to various participants (e.g., enterprise-related individuals) of group communication sessions, which comprise, for example, voice data, image data (e.g., facial image data), video data, etc.).

The communication session participant database 106 in the present embodiment is implemented using one or more storage systems associated with identifying metadata augmentation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with identifying metadata augmentation system 105 are one or more input-output devices, which illustratively comprise keyboards, displays or other types of input-output devices in any combination. Such input-output devices can be used, for example, to support one or more user interfaces to identifying metadata augmentation system 105, as well as to support communication between identifying metadata augmentation system 105 and other related systems and devices not explicitly shown.

Additionally, identifying metadata augmentation system 105 in the FIG. 1 embodiment is assumed to be implemented using at least one processing device. Each such processing device generally comprises at least one processor and an associated memory, and implements one or more functional modules for controlling certain features of identifying metadata augmentation system 105.

More particularly, identifying metadata augmentation system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows identifying metadata augmentation system 105 to communicate over the network 104 with the user devices 102, and illustratively comprises one or more conventional transceivers.

The identifying metadata augmentation system 105 further comprises image and video processing engine 112, audio processing engine 114, and automated action generator 116.

It is to be appreciated that this particular arrangement of elements 112, 114 and 116 illustrated in the identifying metadata augmentation system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for augmenting identifying metadata related to event participants using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, identifying metadata augmentation system 105 and communication session participant database 106 can be on and/or part of the same processing platform.

An exemplary process utilizing elements 112, 114 and 116 of an example identifying metadata augmentation system 105 in computer network 100 will be described in more detail with reference to the flow diagram of FIG. 8.

Accordingly, at least one embodiment includes augmenting identifying metadata related to event participants using artificial intelligence techniques. Such an embodiment can include automatically discovering and/or identifying each of one or more participants in a group communication session (e.g., a group call) attending from at least one common room (e.g., a conference room), and augmenting identity-related metadata of each identified participant. Also, such an embodiment can include implementation in connection with a hybrid communication session (e.g., wherein at least one participant is participating from a common office location and at least one participant is participating remotely from a non-common office location) as well as in connection with a fully in-person communication session (e.g., wherein all participants are participating from a common location).

One or more embodiments include identifying one or more individuals by integrating voice recognition techniques with respect to audio data from the given group communication session and image recognition techniques (e.g., facial recognition techniques) with respect to image and/or video data from the given group communication session conference call. Such an embodiment includes implementing at least one artificial intelligence-based engine which captures and/or identifies voice data and image data (e.g., facial image data) of one or more individuals participating in a group communication session from a common office location, and comparing at least a portion of such voice data and image data with one or more relevant databases (e.g., at least one enterprise-related database associated with the group communication session, such as, for example, communication session participant database 106 in FIG. 1).

By way of illustration, and as further detailed herein, while a given individual participating from a common office location is speaking in the group communication session, at least one embodiment can include determining and displaying (e.g., via at least one graphical user interface associated with at least one communication program being used by one or more participants of the group communication session) identity-related metadata (e.g., name, company, role, etc.) of the individual as well as that of one or more other individuals who have joined the group communication session from the common office location. In such an embodiment, while at least one camera is on and displaying the common office location, at least a portion of the identity-related metadata of the participant(s) therein is displayed via at least one interface proximate to the participant(s) in question. Additionally or alternatively, while in a transcription mode associated with a group communication session, one or more embodiments can include recording identity-related metadata of one or more participants participating from a common office location.

Figure 2:
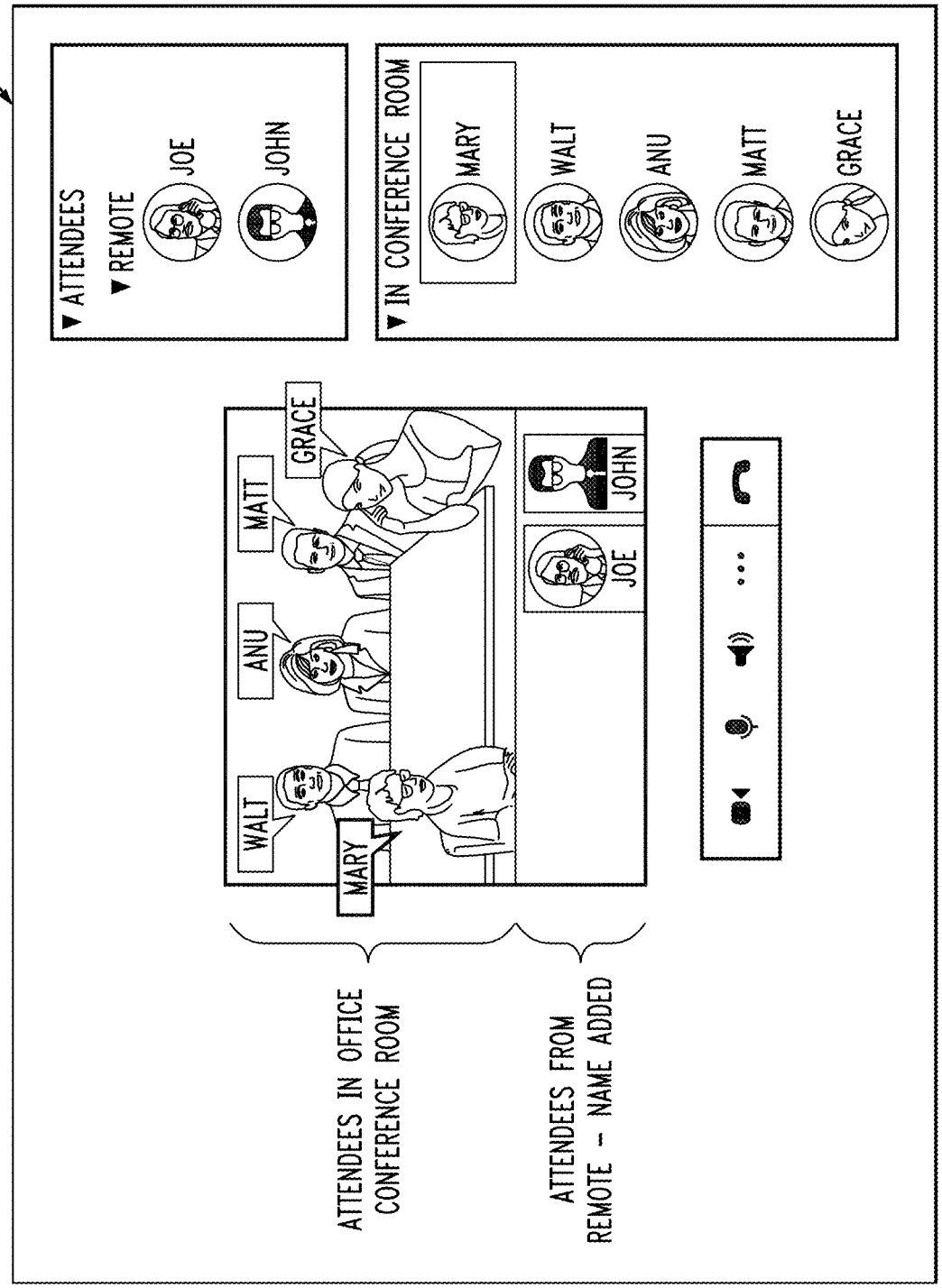
FIG. 2 shows an example conference meeting interface in an illustrative embodiment.

FIG. 2 shows an example conference meeting interface in an illustrative embodiment. By way of illustration, FIG. 2 depicts an example interface 200 depicting a common office location (e.g., a conference room) with five participants (i.e., Mary, Walt, Anu, Matt and Grace) participating in a group communication session from that common office location. Additionally, in such an example embodiment, assume that two participants (i.e., Joe and John) are participating in the group communication session from one or more remote locations. The names of the five participants participating from the common office location are displayed, via interface 200, and can be seen by the remote participants. By way of example, the names can be displayed in a list of participants, displayed near the respective participants on interface 200, and/or highlighted in interface 200 based at least in part on which participant is speaking.

Such an embodiment can include identifying and/or recognizing one or more voices and/or one or more faces of the participants participating from the common office location. Further, one or more embodiments can include storing samples of participant voice data and/or image data (e.g., facial image data) in at least one database for subsequent processing (e.g., comparing against input data, training and/or fine-tuning one or more artificial intelligence techniques, etc.). Additionally, at least one embodiment can include identifying one or more participants (e.g., one of the five participants noted in the example above) leaving the common office location and removing any corresponding identity-related metadata from an interface associated with the given group communication session.

Figure 3:
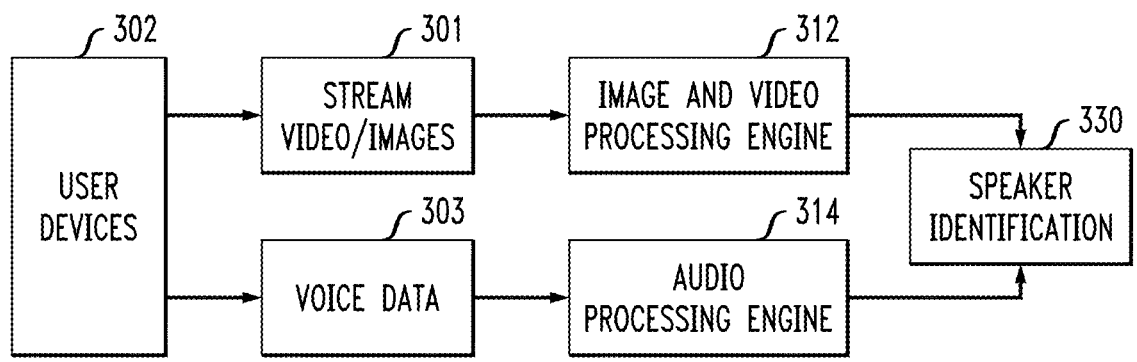
FIG. 3 shows example system architecture in an illustrative embodiment.

FIG. 3 shows example system architecture in an illustrative embodiment. By way of illustration, FIG. 3 depicts user devices 302, which are used in connection with providing at least one stream of video and/or image data 301 to image and video processing engine 312, as well as providing voice data 303 to audio processing engine 314. As further detailed below, at least a portion of the outputs of image and video processing engine 312 and audio processing engine 314 are used to generate at least one speaker identification 330. By way of example, in one or more embodiments, image and audio features are used as input to a decision engine (e.g., a classifier) to identify the speaker (e.g., resulting in speaker identification 330).

In one or more embodiments, both voice data and image data are processed using one or more artificial intelligence techniques (e.g., audio processing engine 314 and image and video processing engine 312, respectively) to identify group communication session participants (e.g., participants participating from at least one common office location). Alternatively, at least one embodiment includes processing only one of voice data and image data using at least a portion of the one or more artificial intelligence techniques, depending on the capabilities and/or configured settings of the software being used in conjunction with the given group communication session (e.g., video capabilities are not enabled in the common office location, one or more participants have not/do not speak during the group communication session, etc.).

In at least one embodiment, processing of video and/or image data 301 can include implementing one or more segmentation techniques as part of image and video processing engine 312. By way of illustration, consider a use case wherein there will be one visual data source (e.g., one stream of video data) for all participants in a common office location. In such a context, one or more embodiments include segmenting the images of every individual participant displayed via the data, and using at least one object identification technique to augment identity-related metadata associated with each individual participant. Such an embodiment can include using at least one mask R-CNN technique, which is based at least in part on one or more CNNs and represents an extension of faster R-CNN, which is an object identification algorithm. Mask R-CNN, being an object detection model, is implemented by one or more embodiments to provide a flexible mechanism to identify one or more regions of interest inside one or more images.

Additionally, at least one embodiment includes learning behavior semantic segmentation with end-to-end, pixel-to-pixel action and speeding up learning and inferencing at the same time (e.g., by using one or more FCNNs, which have the capability of learning and inferring at the same time). Accordingly, using such an embodiment, a range of pixel-level problems can be solved using an FCNN, which represents an example type of CNN with a broad set of models.

Figure 4:
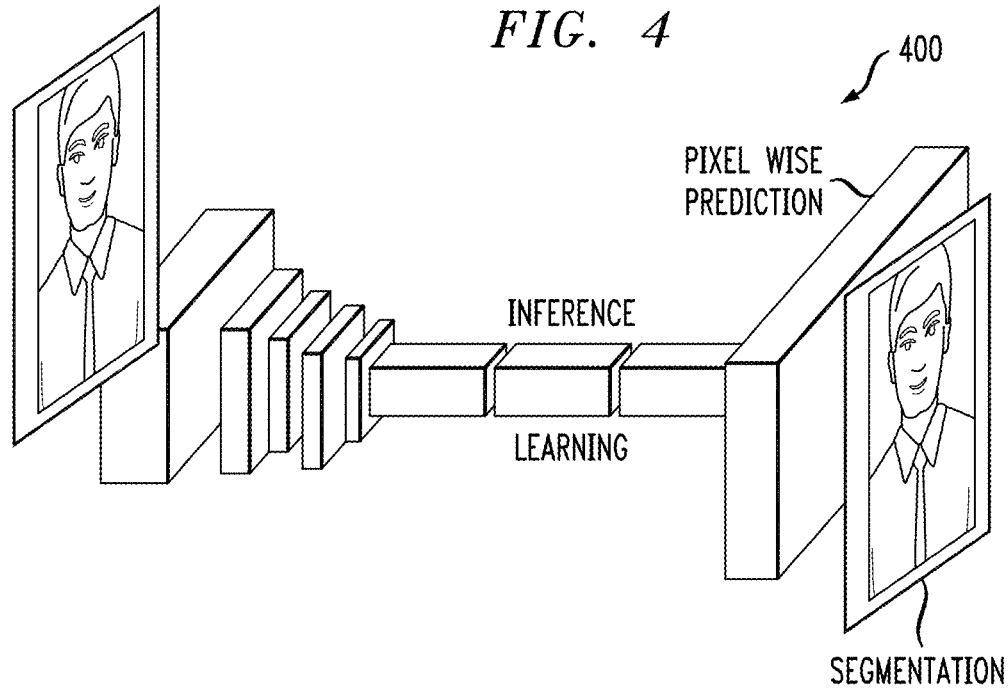
FIG. 4 shows an example fully convolutional neural network (FCNN) in an illustrative embodiment.

FIG. 4 shows an example FCNN 400 in an illustrative embodiment. More specifically, FIG. 4 depicts an example FCNN 400 which can be implemented as part of an image and video processing engine as described herein (e.g., engine 112 in FIG. 1 and/or engine 312 in FIG. 3). CNNs (such as, for example, FCNN 400) can include visual models that yield hierarchies of features. In one or more embodiments, an FCNN's data layers can each include a three-dimensional array of size: h×w×d, with h and w being spatial dimensions and d being the feature or channel dimension. In such an embodiment, an image is the first layer, with pixel sizes of h×w, and color channels of d. Additionally, a FCNN can be based at least in part on translation invariance, wherein, for example, convolution, pooling, and activation functions can operate on local input regions and can only be dependent on relative spatial coordinates. As indicated as part of FIG. 4, FCNN 400 can perform inference (i.e., determining meaning from the data), learning (i.e., training the model using the data), and segmentation (i.e., splitting or grouping the data). Also, one or more embodiments include using CNNs, which represent architectures used, for example, in computer vision techniques and machine learning techniques. An example CNN uses one or more convolution layers, one or more min-max pooling layers, and one or more fully connected layers, stacking such layers together to form a complete architecture.

Figure 5:
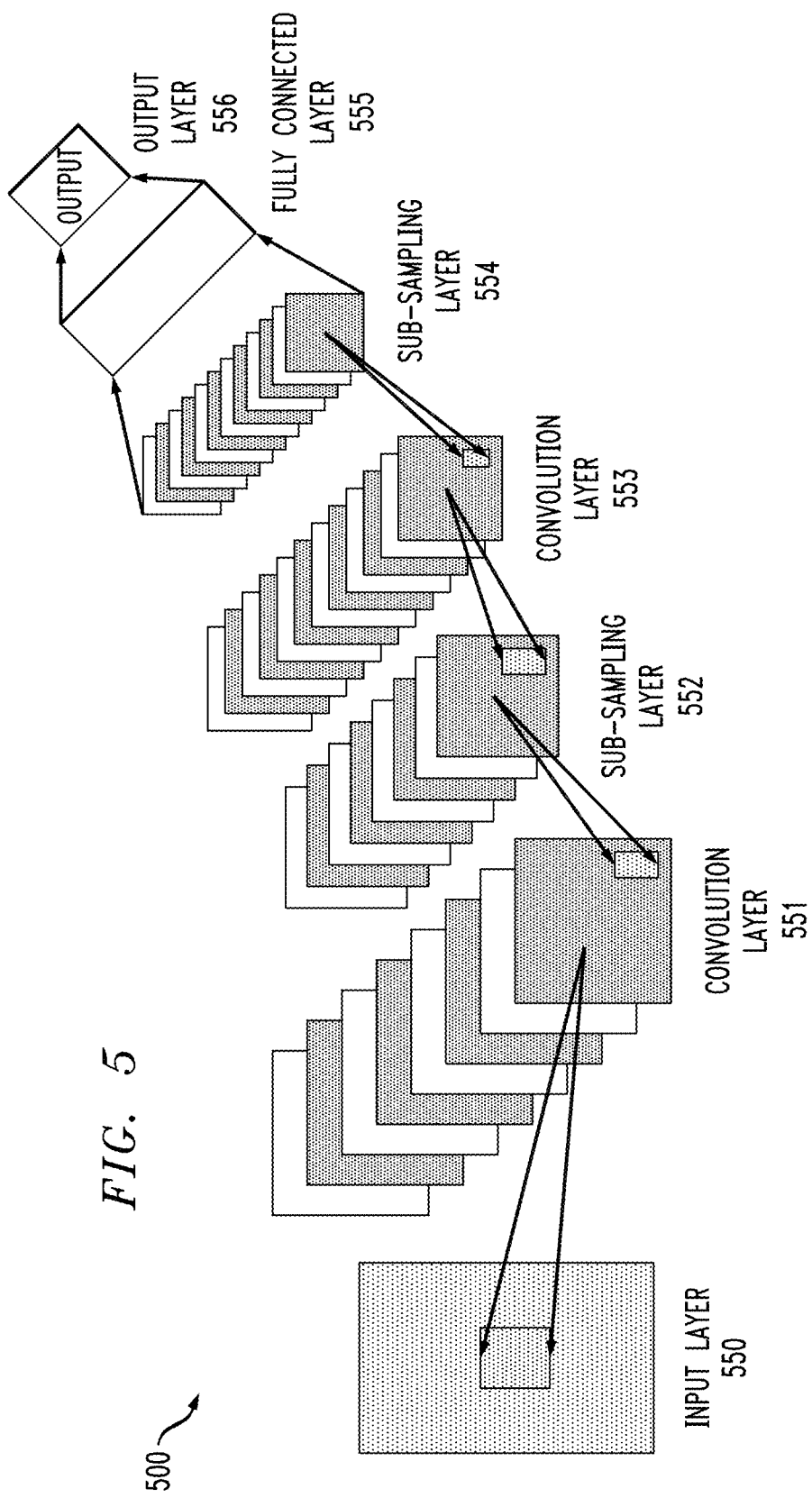
FIG. 5 shows example CNN architecture in an illustrative embodiment.

FIG. 5 shows example CNN architecture in an illustrative embodiment. By way of illustration, FIG. 5 depicts an example CNN 500 which includes an input layer 550 which contains pixel values of a given image (e.g., an image of at least a portion of a face of a group communication session participant). Additionally, CNN 500 includes a convolutional layer 551 that convolves the 1×1 kernels with x feature maps of its preceding layer. In other words, in such an embodiment, 1×1 kernels do not take neighborhood into account, but work solely by recombining the channels of the feature maps. If the next layer (e.g., sub-sampling layer 552) has one or more feature maps, then n×m convolutions are performed, and n×m×(w×h×1×1) multiply-accumulate (MAC) operations are needed, wherein h and w represent the feature map height and width of the next layer (e.g., sub-sampling layer 552). In other words, a 1×1 kernel is combined with height and width values as well as features n and m. Also, a function of the convolutional layer 551 includes calculating the output of all of the neurons which are connected to the input layer. Activation functions such as, for example, rectified linear unit (ReLU), sigmoid, tanh, etc., aim to apply element-wise activation and to add non-linearity into the output of at least one given neuron.

Further, in connection with CNN 500, sub-sampling layer 552 (e.g., a min-max pooling layer) is responsible for achieving spatial invariance by minimizing the resolution of a feature map. In at least one embodiment, one feature map of the preceding CNN model layer (e.g., convolution layer 551) corresponds to one pooling layer (e.g., sub-sampling layer 552). For example, a max-pooling layer can include a window function to the input data, wherein only the most active feature in a pooling region is selected. Such a max pooling function represents a pooling operation that selects the maximum element from the region of the feature map covered by a given filter. Accordingly, the output after implementing a max pooling layer can include a feature map containing the most prominent features of the previous feature map.

Additionally, in one or more embodiments, a pooling region technique allows the top-p activations to pass through the pooling rate, wherein p indicates the total number of selected activations. For a random pooling region $X_i$, such an embodiment can include denoting the nth-picked activation as $act_n$, wherein:

$$act_n = \max\left(X_i \; \theta \sum_{j=1}^{n-1} act_j\right),$$

wherein the value of n=[1, p], wherein j is an index between 0 and n, and wherein n is constrained by both the size of input feature maps and the size of pooling regions. The above pooling region can be expressed wherein the symbol θ represents removing elements from the assemblage. The summation character in the above $act_n$ equation represents the set of elements that contains the top n−1 activations but does not add the activation values numerically (wherein the top n refers to the maximum value determined from the above-noted max pooling function). After having the top p activation value, at least one embodiment includes computing the average of each such value. Then, a hyperparameter is taken as a constraint factor (σ) that computes the top p activations. The final output can then be characterized as follows:

$$\text{output} = \sigma * \sum_{j=1}^{p} act_j,$$

wherein the summation symbol represents the addition operation, and wherein σ∈(0,1). Particularly, if σ=1/p, the output is the average value, and the constraint factor (σ) can be used to adjust the output values.

Referring again to FIG. 5, convolution layers 551 and 553, as well as sub-sampling layers 552 and 554, are implemented twice because, in one or more embodiments, sub-sampling is devised to reduce the reliance of precise positioning within feature maps that are produced by convolutional layers, and as such, more accurate positions can be determined.

As also depicted in FIG. 5, a fully connected layer 555 is included as part of the CNN 500, and in connection with such a layer, each neuron is directly connected to each neuron on both sides (i.e., the neurons of one layer are connected with neurons of a previous layer and neurons of the next layer (e.g., the last frame of the pooling layer are converted into a vector and then are connected to the first layer of the fully connected layer)). By way of example, in such an embodiment, all of the neurons in the last frame of sub-sampling layer 554 layer can be converted into a vector and connected to the first layer of the fully connected layer 555.

In CNN 500, output layer 556 is the last layer. After multiple layers of convolutions and padding, the output needs to be generated in the form of a class. In at least one embodiment, the convolution and pooling layers would only be able to extract features and reduce the number of parameters from the original images. However, to generate the final output, a fully connected layer (e.g., layer 555) needs to be applied to generate an output equal to the number of classes needed. Accordingly, output layer 556 is a fully connected layer, wherein the input from the other layers is flattened and processed so as to transform the output into the number of classes desired by the network. In the convolution layers (e.g., layers 551 and 553), neurons coupled to local regions or receptive fields in the input layer compute a dot product between their weights and a receptive field in the input volume. Each computation extracts a feature map from the image. In other words, consider a 5×5 matrix of data representing an image, and a 3×3 window or kernel is slid around it. At each matrix location, the 3×3 window values are multiplied by the picture values covered by the window. Thus, a single integer representing all values in that image window can be determined and/or generated.

Additionally, one or more embodiments include reducing the number of connections and neurons in the fully connected layer 555, wherein the removed neuron(s) and connections related thereto can be retrieved again by implementing the dropout technique. Such a dropout technique masks certain neurons and leaves others unaltered. For example, a dropout layer might nullify some input vector features or some hidden neurons, preventing CNN training data overfitting.

As also described herein, CNNs can include FCNNs, which include a diverse class of models (including, for example, classification convolutional networks). Accordingly, at least one embodiment includes extending classification networks to segmentation, and improving the architecture with multi-resolution layer combinations, which enhances learning and inference.

Figure 6:
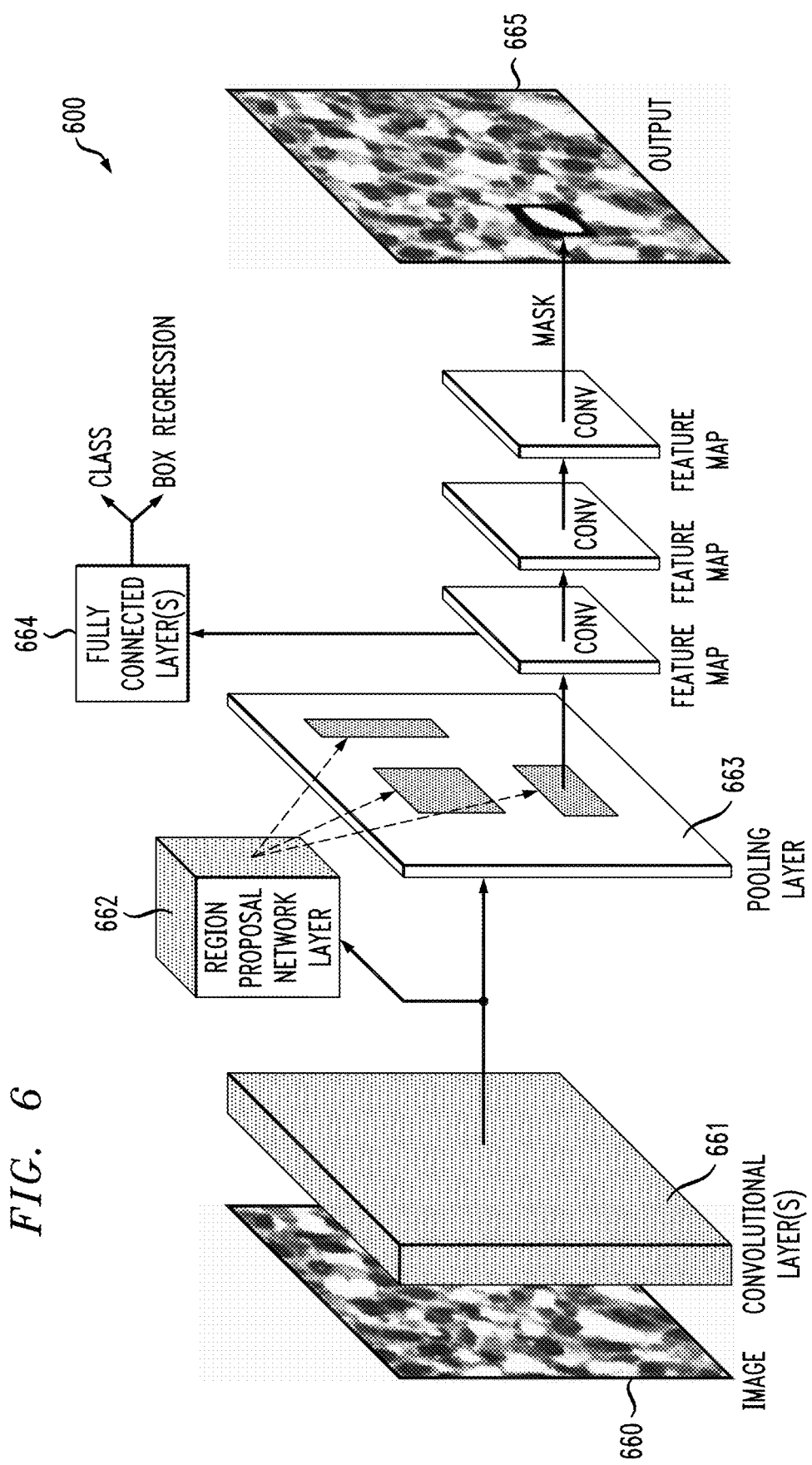
FIG. 6 shows example mask region-based convolutional neural network (R-CNN) architecture in an illustrative embodiment.

FIG. 6 shows example mask R-CNN architecture in an illustrative embodiment. By way of illustration, FIG. 6 depicts an example mask R-CNN 600, which is based at least in part on the CNN architecture, takes an image 660 and extracts one or more features using one or more convolutional layers 661. The extracted feature(s) can act as input to the next layer. As such, in the next layer, which can include a region proposal network layer (RPNL) 662, one or more feature maps are used to predict if an object is present in that region of the image 660. Accordingly, the RPNL 662 identifies at least one region that contain some given object(s), and the region(s) determined and/or identified by the RPNL 662 are then applied to and/or processed by at least one pooling layer 663 to convert all regions into the same shape (using one or more feature maps).

Accordingly, input image 660 is converted to a feature map by convolutional layer(s) 661 and pooling layer 663, and the feature map is used as input for one or more additional steps. For example, such additional steps can include adding one or more filters and/or one or more feature detectors to the input image 660 to generate the feature map and/or an activation map. Feature detectors and/or filters help find elements such as edges, vertical lines, horizontal lines, bends, etc., in an image.

Subsequently, such regions are processed by fully connected layer(s) 664, wherein at least one class label and one or more bounding boxes are predicted, resulting in output 665, the detected object (e.g., a person in a communication session).

Referring again to FIG. 3, one or more embodiments can also include implementing, as part of image and video processing engine 312, an object comparative analysis component, which analyze visual data such as, for example, an individual's seating position to assist in identifying the face of the individual. Tracking an object in a video sequence can present challenges, and in some instances, new and/or future position(s) of the object can be estimated. For example, objects which are not detected by an object detection algorithm can have their positions calculated using information pertaining to their positions in previous images. Additionally, for each tracked object, one or more embodiments include calculating the object's speed (e.g., in pixels per second) at time t, which is the difference of a coordination point of bounding box centers between positions of this object in images at times t and t−1.

Additionally or alternatively, at least one embodiment includes implementing a single object tracking technique that combines object detection and one or more recurrent neural networks. Such an embodiment can include using a recurrent you only look once (YOLO) object detection technique, which is a combination of at least one YOLO algorithm and at least one recurrent neural network such as a long short-term memory (LSTM) network. In such an embodiment, an object detection module uses the YOLO algorithm to collect and/or process one or more visual features, along with one or more location inference priors. At each time-step (also referred to herein as a frame), the LSTM receives an input feature vector (e.g., a feature vector of length 4096) and returns the location of the tracked object.

By using such information, at least one machine learning model can classify the type of seating position associated with a given individual, as well as record related context information and style information. Such context information and style information can include, for example, the seating position of the participant, including facing forward, tilted to side, etc.

Referring again to FIG. 3, and as detailed herein, one or more embodiments also include performing audio and/or voice data analysis using audio processing engine 314. Accordingly, such an embodiment includes training one or more model parameters to provide one or more discrimination classes, as well as capturing the time frequency and energy of one or more speech waveforms.

Figure 7:
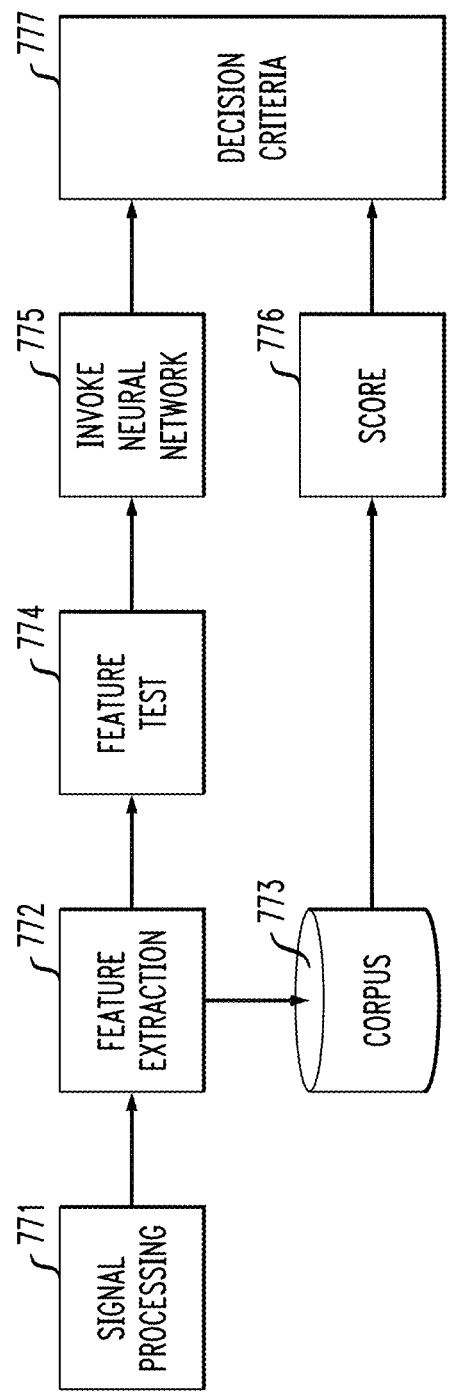
FIG. 7 shows voice signal processing and feature extraction in an illustrative embodiment.

FIG. 7 shows voice signal processing and feature extraction in an illustrative embodiment. In connection with the workflow depicted in FIG. 7, as each speaker provides unique sets of utterances through a microphone, at least one embodiment includes processing and/or recognizing the speaker's voice (based, for example, on a model trained using various voice samples). In such an embodiment, multiple elements constitute a captured analogue voice waveform, wherein such elements can include background noise signals, silence or non-voiced segments, and speech segments. Also, the voice waveform can be digitalized, and signal processing can be carried out thereon in step 771 to remove noise signals and silent and/or non-voiced components in order to ultimately extract one or more pertinent speech signals.

In one or more embodiments, the extracted speech signals are then transformed, in feature extraction step 772, into streams of one or more voice pattern classification feature vectors and one or more training template feature vectors. One or more recognizable speech features of speakers are matched (e.g., to individuals associated with data samples in at least one corpus 773) using at least one score 776 computed by one or more Gaussian mixture models (e.g., wherein such a score 776 represents the match of the voice based on corpus data). As also depicted in FIG. 4, a feature test carried out in step 774 represents a validation of the extracted speech signals. Based at least in part on a correlation analysis of the speech characteristics of one or more speakers from artificial neural networks, invoked in step 775, and Gaussian mixture models (GMMs), decision and/or determination criteria 777 for voice recognition of speakers can be developed and/or fine-tuned.

Background noise signals from various sources such as, for example, ambient noise, one or more microphone terminals, one or more communication channels, etc., can be present in the speech signals of at least one given speaker. Accordingly, a discretized speech signal of a spoken utterance can be processed using a second-order Butterworth infinite impulse response (IIR) high pass digital filter for filtering (g[n]*h[n]) to remove low background noise signals, wherein the transfer function of a digital filter h[n] is the ratio of the n-transforms of the filter output and a finite difference equation g[n].

The processed continuous speech signal can then be divided into overlapping frames in order to allow each frame's signal distribution to be independently analyzed and appropriately represented by a feature vector, removing any silence or non-voiced components from the spoken utterance. In connection with such an embodiment the number of samples ($N_S$) used to create each frame can be determined using the following equation:

$$N_S = \text{floor}\left(\frac{r - N + M}{M}\right)$$

wherein r refers to the given speech signal's length, N refers to the number of samples used to create each frame, $N_S$ refers to the floor of the number of samples obtained, and M refers to the distance between frames. As a result, for example, if the first frame includes the first N samples, the second frame will start M samples later and overlap the first frame by N–M samples. Additionally or alternatively, in one or more embodiments, the signal distribution in each frame can include one or more stationary characteristics.

The speech signal is then transformed into one or more streams of feature vector coefficients containing only the information about the spoken utterance that is necessary for its recognition after other information in the voice signal(s) has been suppressed and/or removed. Also, in at least one embodiment, time domain analysis and/or spectral domain analysis (e.g., using at least one Mel frequency cepstral coefficient (MFCC) algorithm) can be used to extract the feature vectors of the speech signal. Further, such an embodiment can include narrowing a speech feature space to a set of representative feature vectors sufficient to accurately describe the extracted speech features of the utterance.

Additionally, one or more embodiments also include training one or more neural networks. In such an embodiment, at least one back propagation algorithm is used to train at least one artificial neural network (ANN). The number of neurons in the input and hidden layers, as well as the number of layers needed and/or implemented for the given task, are factors in the ANN architecture's ability to produce an effective and desirable result. Accordingly, in at least one embodiment, the number of neurons in each layer is varied through network training until an ideal and/or optimized number of neurons is determined in connection with producing the best training outcome(s). By way merely of example, if there are 19 input features to an ANN, 25 will be sufficient, meaning that the first layer of the hidden layers can contain 25=32 neurons while the second layer can contain half of that amount, the third layer can contain half of the amount in the second layer, and then the fourth layer can contain half of the amount in the second layer, before ultimately proceeding to the output layer.

By way of illustration, in one or more or more embodiments, the input layer of an implemented neural network displays the extracted feature vectors for each speech utterance, and the output layer of the implemented neural network identifies the speaker and speech content that was most likely to have been spoken. Such an embodiment can include setting the target output to "1" for correct speech signals (utterances) and "0" for other speech signals because the back propagation method typically requires provision of a target value that is used during training.

Decisions regarding learning rate, momentum factor, and number of network training epochs can be determined in connection with designing an ANN. Repeating the test utterances for each variation can facilitate determination of how such parameters affect results. For instance, when a lower learning rate was used, the algorithm's gradual learning process resulted in a longer time for convergence. On the other hand, the algorithm diverged when a higher learning rate was used because the learning process was more acute.

Also, in one or more embodiments, extracted feature vectors of spoken utterances that most closely match speech feature templates in one or more relevant databases can be used to calculate GMM parameters for speaker recognition. Methods for estimating GMM parameters, which describe the component distribution of the extracted speech feature vectors, can include, for example, techniques related to mixture weights, mean vectors, and covariance matrices.

At least one embodiment can also include implementing at least one iterative expectation maximization (EM) algorithm, which is used to obtain maximum likelihood estimates. In order to adhere to an ANN model and allow the model to capture variations in a given speech signal, such an embodiment can include using a one-state hidden Markov model (HMM) with multiple Gaussian distributions describing the single state in the development of a GMM recognizer model. Additionally or alternatively, one or more embodiments can include using a multi-state HMM with a single Gaussian distribution, describing each state, to model the GMM.

At least one embodiment also includes implementing a recognition decision system. In such an embodiment, determining a correlation coefficient serves as a decision task for the recognition of speakers from the combined ANN and GMM frameworks. By comparing the recognized feature of the speech frames of the detected speaker from the ANN and GMM to gauge the degree of similarity, this evaluates the quality of the match. To determine the maximum probability of speaker recognition, such an embodiment includes using variations in the training capabilities of the ANN and the GMM. If a speaker's testing utterance's MFCC feature vectors are $X_n$ (wherein n=1, 2, ..., N), the GMM produces XGMM for the detected speaker's speech feature vector and the ANN produces XANN for the detected speaker's speech feature vector.

Accordingly, in such an embodiment, XGMM and XANN represent feature vectors. The MFCC function returns Mel frequency cepstral coefficients over time. That is, the function separates the audio into short windows and calculates the MFCC (i.e., feature vectors) for each window. In an example embodiment, the GMM is a four-element vector that contains the red, green, blue (RGB) values and the Sobel magnitude value to minimize the non-edge noise, and XGMM represents the size of these four elements. Additionally, in such an embodiment, the ANN classifier will decide upon the genre of the audio file. Audio files typically have a mixture of speech and background noise components, and as such, both background noise and speech feature extraction is required for the classification task.

In one or more embodiments, such a recognition decision system considers the speaker to be recognized once there is a sufficiently strong degree of correlation (value) between the outputs of the two frameworks within a significance level of less than a given amount (e.g., five percent), and the name of the recognized speaker is extracted from at least one associated database and displayed on the graphical user interface associated with the group communication session.

It is to be appreciated that some embodiments described herein utilize one or more artificial intelligence models. It is to be appreciated that the term "model," as used herein, is intended to be broadly construed and may comprise, for example, a set of executable instructions for generating computer-implemented predictions. For example, one or more of the models described herein may be trained to generate predictions based at least in part voice data, image data, and/or video data associated with various individuals, and such predictions can be used to initiate one or more automated actions (e.g., automatically augmenting identity-related metadata in connection with participants in a group communication session).

Figure 8:
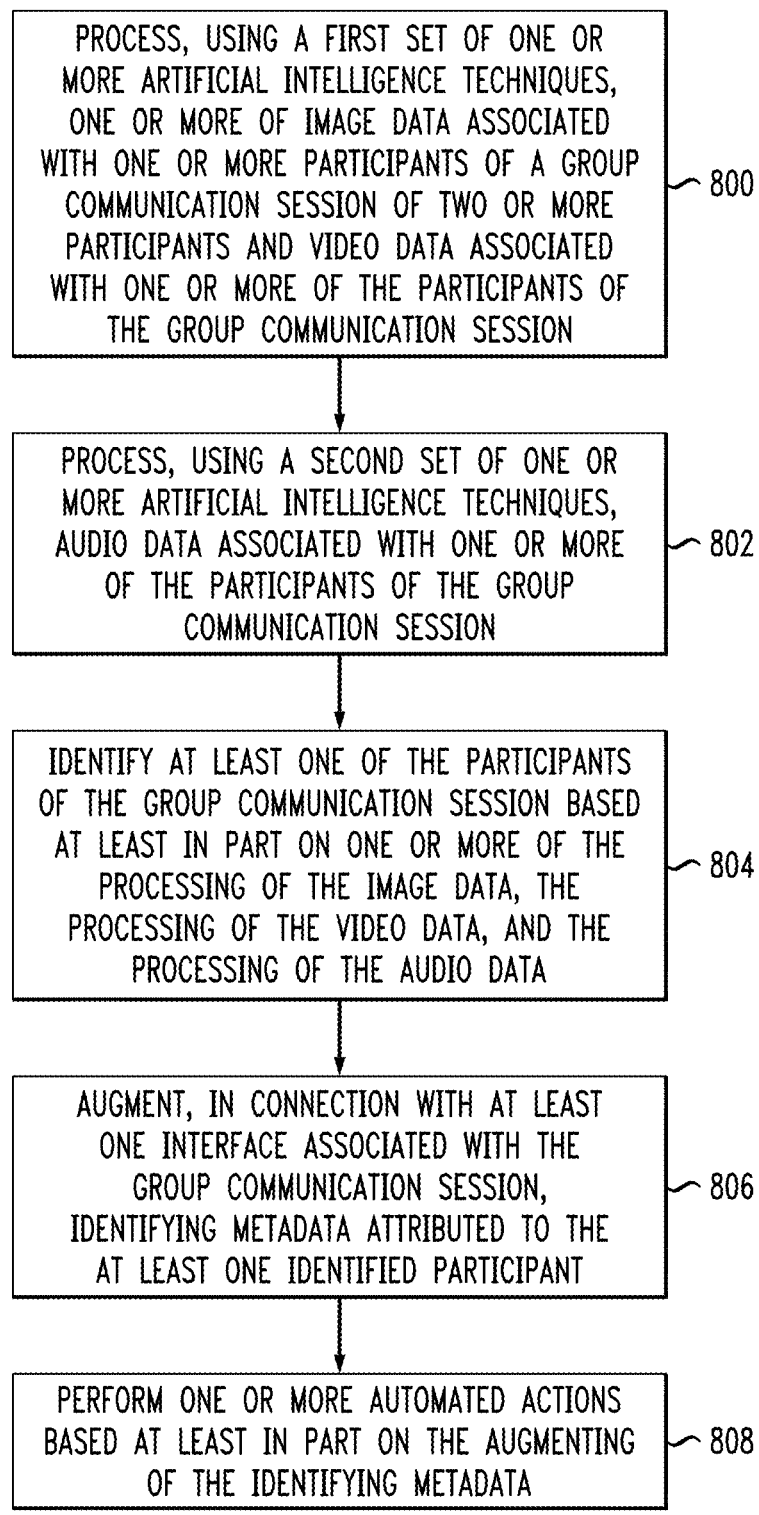
FIG. 8 is a flow diagram of a process for augmenting identifying metadata related to group communication session participants using artificial intelligence techniques in an illustrative embodiment.

FIG. 8 is a flow diagram of a process for augmenting identifying metadata related to event participants using artificial intelligence techniques in an illustrative embodiment. It is to be understood that this particular process is only an example, and additional or alternative processes can be carried out in other embodiments.

In this embodiment, the process includes steps 800 through 808. These steps are assumed to be performed by identifying metadata augmentation system 105 utilizing elements 112, 114 and 116.

Step 800 includes processing, using a first set of one or more artificial intelligence techniques, one or more of image data associated with one or more participants of a group communication session of two or more participants and video data associated with one or more of the participants of the group communication session. In at least one embodiment, processing one or more of the image data and the video data includes identifying one or more regions of interest within the one or more of the image data and the video data using one or more image segmentation techniques in conjunction with at least one mask region-based convolutional neural network. Additionally or alternatively, processing one or more of the image data and the video data can include identifying one or more visual features within the one or more of the image data and the video data using at least one FCNN.

Also, in at least one embodiment, processing one or more of the image data and the video data can include identifying body positioning information attributed to at least one of the one or more participants by processing one or more of the image data and the video data using one or more object comparative analysis techniques in conjunction with one or more facial recognition techniques. Additionally or alternatively, processing one or more of the image data and the video data can include implementing at least one single object tracking technique that combines one or more object detection techniques and at least one recurrent neural network.

Step 802 includes processing, using a second set of one or more artificial intelligence techniques, audio data associated with one or more of the participants of the group communication session. In one or more embodiments, processing audio data includes extracting speech signals from the audio data and transforming at least a portion of the extracted speech signals into one or more feature vectors. In such an embodiment, processing audio data can include matching, using one or more Gaussian mixture models, at least one of the one or more feature vectors to one or more historical data samples associated with one or more group communication session participants. Additionally or alternatively, in such an embodiment, transforming at least a portion of the extracted speech signals into one or more feature vectors can include using at least one of one or more time domain analysis techniques and one or more spectral domain analysis techniques.

Additionally, in one or more embodiments, processing audio data can include removing one or more background noise signals from the audio data by processing at least a portion of the audio data using at least one infinite impulse response high pass filter.

Step 804 includes identifying at least one of the participants of the group communication session based at least in part on one or more of the processing of the image data, the processing of the video data, and the processing of the audio data.

Step 806 includes augmenting, in connection with at least one interface associated with the group communication session, identifying metadata attributed to the at least one identified participant. In at least one embodiment, the at least one interface associated with the group communication session includes at least one graphical user interface associated with at least one communication-based software program being used by one or more of the participants in connection with participating in the group communication session.

Step 808 includes performing one or more automated actions based at least in part on the augmenting of the identifying metadata. In one or more embodiments, performing one or more automated actions includes automatically training at least one of the first set of one or more artificial intelligence techniques and the second set of one or more artificial intelligence techniques based at least in part on feedback related to the augmenting of the identifying metadata. Additionally or alternatively, performing one or more automated actions can include displaying, during one or more instances of the group communication session and at one or more locations of the at least one interface, identifying metadata attributed to the at least one identified participant, wherein the identifying metadata comprises one or more of participant name, participant enterprise information, participant location, and participant role information.

Additionally, in at least one embodiment, one or more of the participants of the group communication session participate in the group communication session from a given enterprise location and one or more of the participants of the group communication session participate in the group communication session from at least one remote location.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically augment identifying metadata related to event participants using artificial intelligence techniques. These and other embodiments can effectively overcome problems associated with inefficient and/or time-intensive group communications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines.

The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
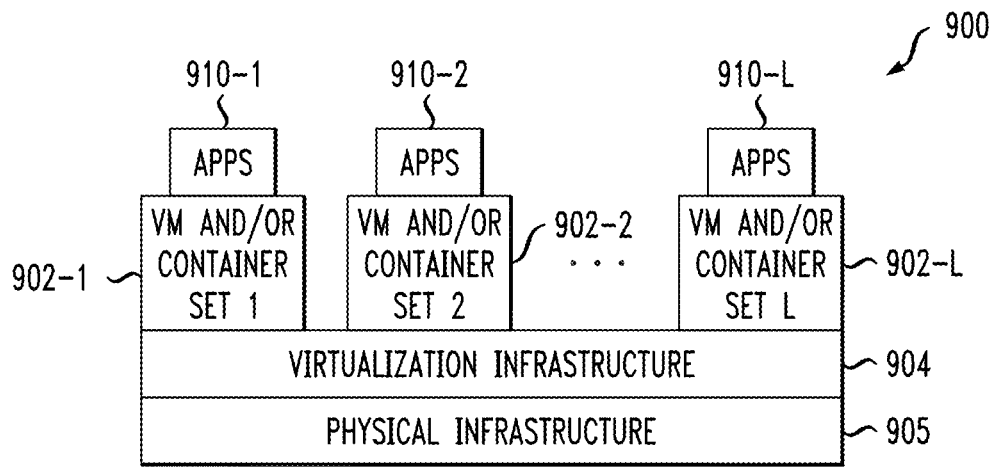
FIGS. 9 and 10 show examples of processing platforms that may be utilized to implement at least a portion of an information processing system in illustrative embodiments.
Figure 10:
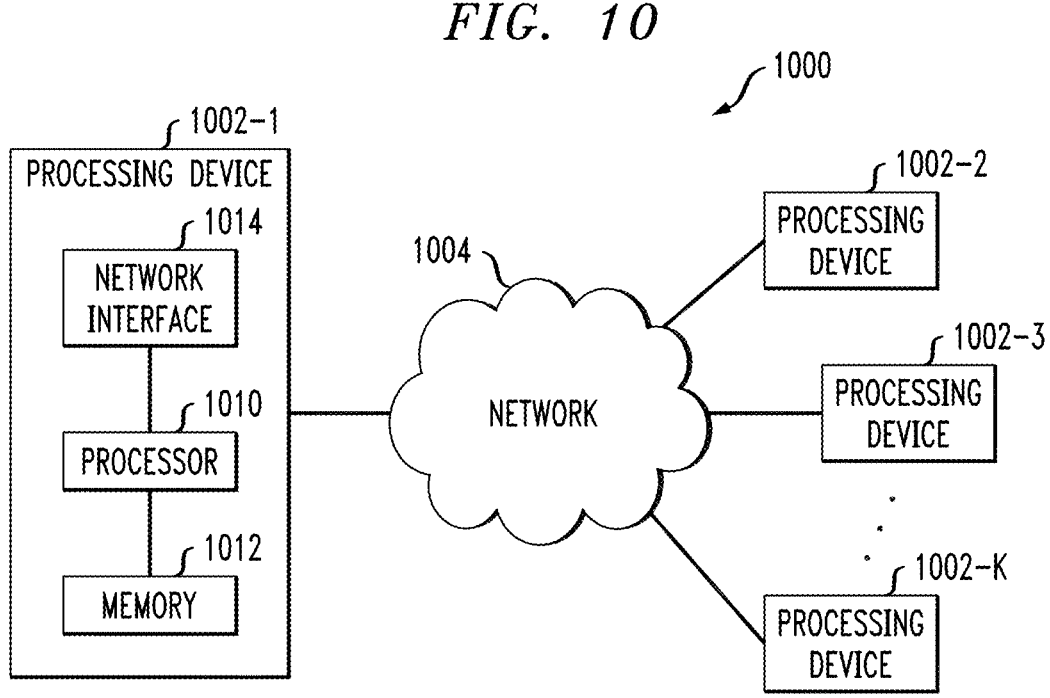

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more information processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a CPU, a GPU, a TPU, a microcontroller, an ASIC, a FPGA or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
processing, using a first set of one or more artificial intelligence techniques, one or more of image data associated with one or more participants of a group communication session of two or more participants and video data associated with one or more of the participants of the group communication session, wherein processing one or more of the image data and the video data comprises identifying one or more regions of interest within the one or more of the image data and the video data using at least one mask region-based convolutional neural network, and wherein using the at least one mask region-based convolutional neural network comprises extracting one or more features from the one or more of the image data and the video data using one or more convolutional layers, identifying at least one region in the one or more of the image data and the video data that contains one or more designated objects by processing at least a portion of the one or more extracted features using at least one region proposal network layer, and converting at least a portion of the at least one identified region to one or more feature maps using at least one pooling layer;
processing, using a second set of one or more artificial intelligence techniques, audio data associated with one or more of the participants of the group communication session, wherein processing audio data comprises extracting speech signals from the audio data, and transforming at least a portion of the extracted speech signals into one or more speaker-specific voice pattern classification feature vectors;
identifying at least one of the participants of the group communication session based at least in part on the one or more speaker-specific voice pattern classification feature vectors and one or more of the processing of the image data and the processing of the video data;
augmenting, in connection with at least one interface associated with the group communication session, identifying metadata attributed to the at least one identified participant; and
performing one or more automated actions based at least in part on the augmenting of the identifying metadata, wherein performing one or more automated actions comprises automatically incorporating, into a transcription of at least a portion of the group communication session, at least a portion of the augmented identifying metadata attributed to the at least one identified participant, and wherein the at least one identified participant comprises at least one participant physically present in a location shared with at least one additional one of the participants of the group communication session;
wherein the method is performed by at least one processing device comprising a processor coupled to a memory.

2. The computer-implemented method of claim 1, wherein processing one or more of the image data and the video data comprises identifying the one or more regions of interest within the one or more of the image data and the video data using one or more image segmentation techniques in conjunction with the at least one mask region-based convolutional neural network.

3. The computer-implemented method of claim 1, wherein processing one or more of the image data and the video data comprises identifying one or more visual features within the one or more of the image data and the video data using at least one fully convolutional neural network.

4. The computer-implemented method of claim 1, wherein processing audio data comprises matching, using one or more Gaussian mixture models, at least one of the one or more speaker-specific voice pattern classification feature vectors to one or more historical data samples associated with one or more group communication session participants.

5. The computer-implemented method of claim 1, wherein transforming at least a portion of the extracted speech signals into one or more speaker-specific voice pattern classification feature vectors comprises using at least one of one or more time domain analysis techniques and one or more spectral domain analysis techniques.

6. The computer-implemented method of claim 1, wherein processing audio data comprises removing one or more background noise signals from the audio data by processing at least a portion of the audio data using at least one infinite impulse response high pass filter.

7. The computer-implemented method of claim 1, wherein processing one or more of the image data and the video data comprises identifying body positioning information attributed to at least one of the one or more participants by processing one or more of the image data and the video data using one or more object comparative analysis techniques in conjunction with one or more facial recognition techniques.

8. The computer-implemented method of claim 1, wherein processing one or more of the image data and the video data comprises implementing at least one single object tracking technique that combines one or more object detection techniques and at least one recurrent neural network.

9. The computer-implemented method of claim 1, wherein performing one or more automated actions comprises automatically training at least one of the first set of one or more artificial intelligence techniques and the second set of one or more artificial intelligence techniques based at least in part on feedback related to the augmenting of the identifying metadata.

10. The computer-implemented method of claim 1, wherein performing one or more automated actions comprises displaying, during one or more instances of the group communication session and at one or more locations of the at least one interface, identifying metadata attributed to the at least one identified participant, wherein the identifying metadata comprises one or more of participant name, participant enterprise information, participant location, and participant role information.

11. The computer-implemented method of claim 1, wherein the at least one interface associated with the group communication session comprises at least one graphical user interface associated with at least one communication-based software program being used by one or more of the participants in connection with participating in the group communication session.

12. The computer-implemented method of claim 1, wherein one or more of the participants of the group communication session participate in the group communication session from a given enterprise location and one or more of the participants of the group communication session participate in the group communication session from at least one remote location.

13. A non-transitory processor-readable storage medium having stored therein program code of one or more software programs, wherein the program code when executed by at least one processing device causes the at least one processing device:
to process, using a first set of one or more artificial intelligence techniques, one or more of image data associated with one or more participants of a group communication session of two or more participants and video data associated with one or more of the participants of the group communication session, wherein processing one or more of the image data and the video data comprises identifying one or more regions of interest within the one or more of the image data and the video data using at least one mask region-based convolutional neural network, and wherein using the at least one mask region-based convolutional neural network comprises extracting one or more features from the one or more of the image data and the video data using one or more convolutional layers, identifying at least one region in the one or more of the image data and the video data that contains one or more designated objects by processing at least a portion of the one or more extracted features using at least one region proposal network layer, and converting at least a portion of the at least one identified region to one or more feature maps using at least one pooling layer,
to process, using a second set of one or more artificial intelligence techniques, audio data associated with one or more of the participants of the group communication session, wherein processing audio data comprises extracting speech signals from the audio data, and transforming at least a portion of the extracted speech signals into one or more speaker-specific voice pattern classification feature vectors;
to identify at least one of the participants of the group communication session based at least in part on the one or more speaker-specific voice pattern classification feature vectors and one or more of the processing of the image data and the processing of the video data;
to augment, in connection with at least one interface associated with the group communication session, identifying metadata attributed to the at least one identified participant; and
to perform one or more automated actions based at least in part on the augmenting of the identifying metadata, wherein performing one or more automated actions comprises automatically incorporating, into a transcription of at least a portion of the group communication session, at least a portion of the augmented identifying metadata attributed to the at least one identified participant, and wherein the at least one identified participant comprises at least one participant physically present in a location shared with at least one additional one of the participants of the group communication session.

14. The non-transitory processor-readable storage medium of claim 13, wherein processing one or more of the image data and the video data comprises identifying the one or more regions of interest within the one or more of the image data and the video data using one or more image segmentation techniques in conjunction with the at least one mask region-based convolutional neural network.

15. The non-transitory processor-readable storage medium of claim 13, wherein processing one or more of the image data and the video data comprises identifying one or more visual features within the one or more of the image data and the video data using at least one fully convolutional neural network.

16. An apparatus comprising:
at least one processing device comprising a processor coupled to a memory;
the at least one processing device being configured:
to process, using a first set of one or more artificial intelligence techniques, one or more of image data associated with one or more participants of a group communication session of two or more participants and video data associated with one or more of the participants of the group communication session, wherein processing one or more of the image data and the video data comprises identifying one or more regions of interest within the one or more of the image data and the video data using at least one mask region-based convolutional neural network, and wherein using the at least one mask region-based convolutional neural network comprises extracting one or more features from the one or more of the image data and the video data using one or more convolutional layers, identifying at least one region in the one or more of the image data and the video data that contains one or more designated objects by processing at least a portion of the one or more extracted features using at least one region proposal network layer, and converting at least a portion of the at least one identified region to one or more feature maps using at least one pooling layer;

to process, using a second set of one or more artificial intelligence techniques, audio data associated with one or more of the participants of the group communication session, wherein processing audio data comprises extracting speech signals from the audio data, and transforming at least a portion of the extracted speech signals into one or more speaker-specific voice pattern classification feature vectors;

to identify at least one of the participants of the group communication session based at least in part on the one or more speaker-specific voice pattern classification feature vectors and one or more of the processing of the image data and the processing of the video data;

to augment, in connection with at least one interface associated with the group communication session, identifying metadata attributed to the at least one identified participant; and to perform one or more automated actions based at least in part on the augmenting of the identifying metadata, wherein performing one or more automated actions comprises automatically incorporating, into a transcription of at least a portion of the group communication session, at least a portion of the augmented identifying metadata attributed to the at least one identified participant, and wherein the at least one identified participant comprises at least one participant physically present in a location shared with at least one additional one of the participants of the group communication session.

17. The apparatus of claim 16, wherein processing one or more of the image data and the video data comprises identifying the one or more regions of interest within the one or more of the image data and the video data using one or more image segmentation techniques in conjunction with the at least one mask region-based convolutional neural network.

18. The apparatus of claim 16, wherein processing one or more of the image data and the video data comprises identifying one or more visual features within the one or more of the image data and the video data using at least one fully convolutional neural network.

19. The apparatus of claim 16, wherein performing one or more automated actions comprises automatically training at least one of the first set of one or more artificial intelligence techniques and the second set of one or more artificial intelligence techniques based at least in part on feedback related to the augmenting of the identifying metadata.

20. The apparatus of claim 16, wherein performing one or more automated actions comprises displaying, during one or more instances of the group communication session and at one or more locations of the at least one interface, identifying metadata attributed to the at least one identified participant, wherein the identifying metadata comprises one or more of participant name, participant enterprise information, participant location, and participant role information.

* * * * *